United States Patent [19]

Auernhammer et al.

[11] Patent Number: 4,851,726
[45] Date of Patent: Jul. 25, 1989

[54] PRESSURING ARRANGEMENT FOR THE YOKE LAMINATION STACK FOR AN ELECTRIC MACHINE

[75] Inventors: Erich Auernhammer; Henrich Schmiedel, both of Nuremberg; Otto Dörfler, Zirndorf, all of Fed. Rep. of Germany

[73] Assignee: Siemens Aktiengesellschaft, Munich, Fed. Rep. of Germany

[21] Appl. No.: 109,294

[22] Filed: Oct. 15, 1987

[30] Foreign Application Priority Data

Nov. 13, 1986 [DE] Fed. Rep. of Germany ... 8630403[U]

[51] Int. Cl.⁴ .............................................. H02K 1/06
[52] U.S. Cl. ..................................... 310/89; 310/91; 310/217
[58] Field of Search ................. 310/42, 89, 91, 217, 310/254, 216, 258, 259; 29/596

[56] References Cited

U.S. PATENT DOCUMENTS

| 3,809,938 | 5/1974 | Sjoberg et al. | 310/217 |
| 3,940,648 | 2/1976 | Wielt et al. | 310/217 |
| 4,538,084 | 8/1985 | Kawada et al. | 310/217 |

OTHER PUBLICATIONS

Magnetgehäuse 1GH5 182 Drawing No. J21 1752, Siemens A.G.
Normal 8S-Gehäuse 1GH5 782 Drawing No. J20 9584, Siemens A.G.

Primary Examiner—Patrick R. Salce
Assistant Examiner—D. L. Rebsch
Attorney, Agent, or Firm—Kenyon & Kenyon

[57] ABSTRACT

A frame-like pressure flange arrangement on the backside of a frame for a yoke lamination stack comprises four spaced wall portions positioned at right angles to one another and connected with connecting pieces. The wall portions have the connecting pieces welded to them in such a manner that all the welds are recessed.

4 Claims, 1 Drawing Sheet

U.S. Patent
Jul. 25, 1989
4,851,726
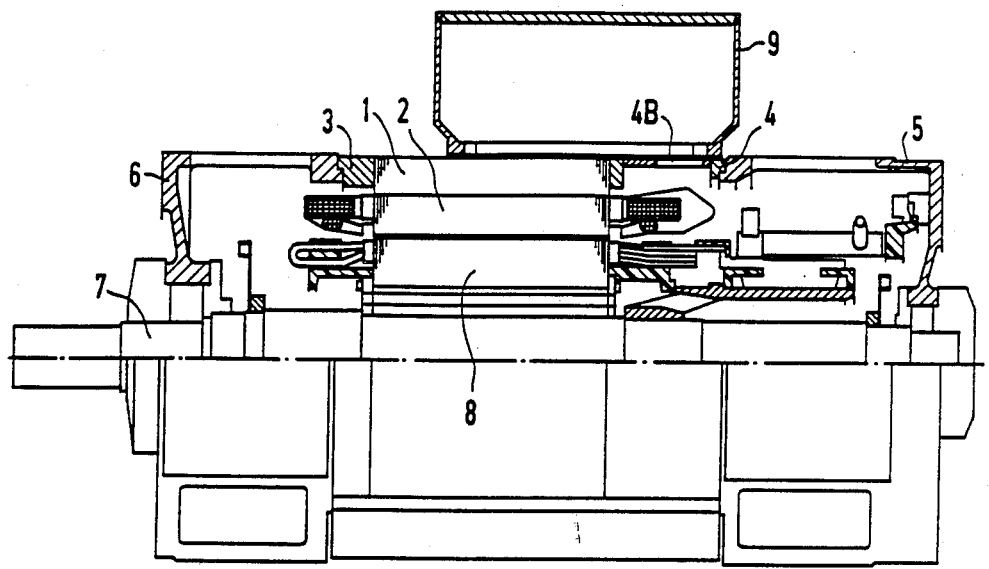
PRIOR ART
FIG 1
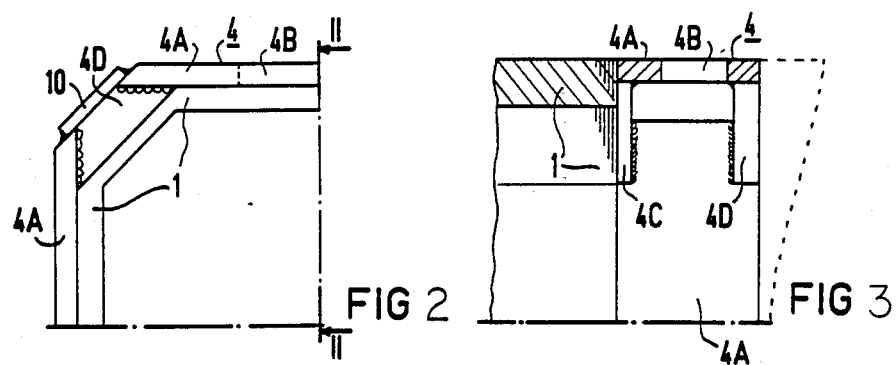
FIG 2
FIG 3
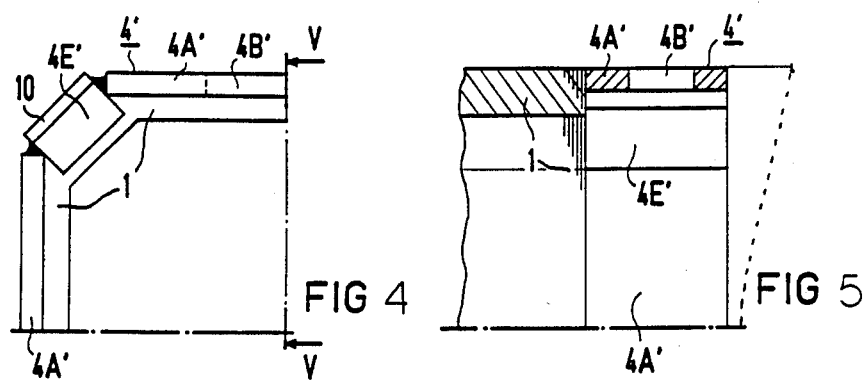
FIG 4
FIG 5

4,851,726

PRESSURING ARRANGEMENT FOR THE YOKE LAMINATION STACK FOR AN ELECTRIC MACHINE

BACKGROUND OF THE INVENTION

1. Field of the Invention

The present invention relates to an improved arrangement for a welded pressure (clamping) flange assembly for an electric induction machine having no housing.

2. Description of the Prior Art

FIG. 1 is a simplified plan view, half in section, of a known type 1GH5 rotary induction machine made by Siemens AG, assignee of the present application. The machine includes a yoke lamination stack 1 having wound laminated stator pole bodies 2, a wound rotor lamination stack 8 mounted on a rotor shaft 7, and end bells 5 and 6 supporting the shaft. The end bells are detachably fastened to polygonal flange arrangements 3 and 4 at respective ends of the yoke lamination stack. The polygonal flange arrangements 3 and 4 are essentially square with bevelled corners (i.e., octagonal) and are welded at the corners to flat strips or straps (not shown). The flat straps are parallel to the longitudinal axis and, with the pressure flange, form a frame. The yoke lamination stack 1 is held together under pressure exerted by the end flanges. The flat straps are also welded to the yoke lamination stack. The frame carrying the yoke lamination stack replaces the usual housing for the machine.

Pressure flange arrangement 3 comprises a one piece flange that is positioned on the drive side. Pressure flange arrangement 4 is a welded frame-like assembly with a peripheral surface that has an angular (octagonal) contour (shape). A passage (opening) 4B is positioned on (located in) one side of the assembly. Yoke lamination stack 1, along with the planar side portion of flange 4 containing passage 4B, supports a terminal box 9 detachably fastened on the planar wall portion. Passage 4B contains connecting conductors, not shown in FIG. 1, that connect to terminals, not shown, in terminal box 9.

Pressure flange arrangement 4 comprises a multisection wall that has an angular contour (polygonal shape). The sections of the wall have bevelled ends that are welded together from the inside. The outer periphery of the wall is welded to one piece flat polygonal flange at the end of the wall facing the yoke lamination stack. Mounting pieces rest against and are welded to the inside of the wall portions in the vicinity of the bevelled ends of the wall portions at the outer end of the flange. The pressure flange arrangement on the backside comprises a multiplicity of parts that have an elaborate shape and a corresponding large number of welds. The welds on the outside must be smoothed. The smoothing operation requires considerable rework, especially in the vicinity of the terminal box.

SUMMARY OF THE INVENTION

The present invention provides a simplified pressure flange arrangement or assembly on the backside of the frame that both forms an extremely strong structure and requires only welds that do not interfere with mating elements. Consequently, there is no need to smooth welds on the outside surface. The frame-like pressure flange arrangement on the backside of the frame for the yoke lamination stack can comprise four planar wall portions that are assembled at right angles. Connecting pieces are attached such that all weld seams are recessed or are on interior surfaces.

BRIEF DESCRIPTION OF THE DRAWINGS

FIG. 1 is a top plan view, half in section, of a 1GH5 machine.

FIG. 2 is an end view, in cross section, of one quadrant of a welded polygonal clamping flange assembly according to the invention, together with an adjacent portion of a yoke lamination stack;

FIG. 3 is a top plan view, in cross section, of the welded clamping flange assembly taken along the line III—III of FIG. 2; and FIGS. 4 and 5 are views similar to FIGS. 2 and 3 showing a second embodiment of the welded flange assembly that has a particularly simple design and uses fewer parts.

DETAILED DESCRIPTION

FIGS. 2 and 3 show one quadrant of a pressure clamping flange arrangement or assembly according to the present invention that contains four planar rectangular wall portions 4A that have bevelled lateral edges. One wall portion includes a rectangular passage (opening) 4B. The wall portions in pressure flange arrangement 4 are the same size. Wall portions 4A are positioned at an angle of 90° relative to each other with the bevelled edges of adjacent portions spaced apart and connected by trapezoidal connecting pieces 4C, 4D to form a flange having an octagonal peripheral shape. The trapezoidal connecting pieces have equal areas defined by parallel exterior and interior surfaces connected by bevelled surfaces and are welded along the inner edges of their bevelled surfaces to the inside of the wall portions. The outside surfaces of the connecting pieces are flush with the bevelled lateral edges of the wall portions. The outside surfaces of both connecting pieces at each corner of the frame are parallel and lie in a plane with the bevelled edges of the wall portions. An end portion of a longitudinal strip 10 is welded at each corner along the bevelled edges of the wall portions where the end portion of the longitudinal strip is mounted against the outer parallel surfaces of connecting pieces 4C, 4D. Pressure flange arrangement 4 thus comprises four wall portions and eight connecting pieces.

FIGS. 4 and 5 show a pressure flange arrangement 4' that uses only four connecting pieces and simplified wall portions that do not have bevelled lateral edges. Each lateral edge of each wall portion 4A' is welded to a slab shaped connecting piece 4E'. The weld seams are located along the lateral edges of wall portions 4A' and of connecting pieces 4E', and the weld seams are laid out so as to cover also the end regions of the longitudinal strips 10 at their lateral edges. This arrangement makes use of simpler outside welds, but the welded joints are not located on surfaces that contact the terminal box, the end bell, or the yoke lamination stack.

What is claimed is:

1. In a housingless rotary electric induction machine having a hollow yoke lamination stack with a longitudinal axis and internal wound stator poles, an open frame containing the yoke lamination stack, the frame including two polygonal pressure flanges, one at each end of the yoke lamination stack, and a plurality of longitudinal straps, each strap having one end portion secured to one of the flanges and an opposite end portion secured to the other of the flanges so as to exert pressure on the ends of the stack through the pressure flanges, each flange including means for mounting a respective end bell for supporting a wound rotor on a shaft coaxial with the longitudinal axis of the yoke lamination stack, and at least one of the polygonal pressure flanges being a multiple piece welded assembly, with an opening through a planar peripheral surface of the flange for passing conductors from the machine winding, and a terminal box detachably mounted on the planar surface and covering the opening, the improvement wherein the at least one multiple piece polygonal pressure flange assembly comprises:

a plurality of wall portions, each portion having a flat exterior surface bounded by an inner edge in contact with the adjacent end of the yoke lamination stack, an outer edge spaced from the inner edge, and two lateral edges extending parallel to the longitudinal axis of the machine, the wall portions being arranged as alternate sides of a polygon, with adjacent lateral edges of adjacent portion being spaced apart; and a plurality of planar connecting pieces, at least one connecting piece being welded to the adjacent lateral edges of adjacent wall portions and having an outer side that forms a mounting surface for the respective end bell, and each planar connecting piece having a planar exterior surface that forms part of the exterior polygonal surface of the flange.

2. An electric machine according to claim 1 wherein:

the flat exterior surface of each of the individual wall portions is rectangular;

adjacent wall portions are arranged at an angle of 90° with respect to each other;

each planar connecting piece is a flat trapezoidal plate having an exterior surface, an interior surface parallel to and longer than the exterior surface, and two bevelled surfaces joining respective ends of the exterior and interior surfaces;

the two connecting pieces are provided in side by side spaced apart relation between the lateral edges of each pair of adjacent wall portions, one connecting piece being located adjacent to the inner surfaces and the other connecting piece being located adjacent to the outer surfaces of the adjacent wall portions, each connecting piece being welded along its bevelled surface edges that face the other connecting piece to the interior surfaces of the corresponding wall portions; and the end portion of one of the longitudinal straps is welded to the spaced apart lateral edges of each pair of adjacent wall portions and rests against the exterior surfaces of the corresponding two trapezoidal connecting pieces.

3. An electric machine according to claim 2 wherein the lateral edges of each individual wall portion are bevelled, said bevelled edges lying in a common plane with the exterior surfaces of the two trapezoidal connecting pieces.

4. An electric machine according to claim 1 wherein each connecting piece is slab-shaped and has two lateral edges;

the lateral edges of only one connecting piece are joined to the corresponding lateral edges of adjacent wall portions by weld seams;

the end portion of each one of the longitudinal straps rests against the flat exterior surface of a corresponding one of the connecting pieces; and the same weld seams also join the end portion of the longitudinal strap to the lateral edges of the connecting piece and of the adjacent wall portions.

* * * * *